(12) United States Patent
Duan et al.

(10) Patent No.: US 11,915,161 B2
(45) Date of Patent: Feb. 27, 2024

(54) METHOD AND APPARATUS FOR SEMANTIC ANALYSIS ON CONFRONTATION SCENARIO BASED ON TARGET-ATTRIBUTE-RELATION

(71) Applicants: TSINGHUA UNIVERSITY, Beijing (CN); NANTONG ADVANCED COMMUNICATION TECHNOLOGY RESEARCH INSTITUTE CO., LTD., Nantong (CN)

(72) Inventors: Yiping Duan, Beijing (CN); Xiaoming Tao, Beijing (CN); Mingzhe Li, Beijing (CN); Ziqi Zhao, Beijing (CN)

(73) Assignees: TSINGHUA UNIVERSITY, Beijing (CN); NANTONG ADVANCED COMMUNICATION TECHNOLOGY RESEARCH INSTITUTE CO., LTD., Nantong (CN)

( * ) Notice: Subject to any disclaimer, the term of this patent is extended or adjusted under 35 U.S.C. 154(b) by 0 days.

(21) Appl. No.: 18/238,545

(22) Filed: Aug. 28, 2023

(65) Prior Publication Data
US 2024/0013075 A1 Jan. 11, 2024

Related U.S. Application Data

(63) Continuation of application No. PCT/CN2023/106625, filed on Jul. 10, 2023.

(30) Foreign Application Priority Data

May 25, 2022 (CN) .......................... 202210573996.X

(51) Int. Cl.
*G06N 7/01* (2023.01)

(52) U.S. Cl.
CPC ....................................... *G06N 7/01* (2023.01)

(58) Field of Classification Search
CPC ........ G06N 7/01; G06F 18/213; G06F 16/285; G06F 18/00; A46B 15/0073; A61C 17/22
See application file for complete search history.

(56) References Cited

U.S. PATENT DOCUMENTS

| 2005/0249221 A1* | 11/2005 | Remi | H04L 47/193 |
| | | | 370/395.5 |
| 2012/0137367 A1* | 5/2012 | Dupont | G06F 21/00 |
| | | | 726/25 |

* cited by examiner

*Primary Examiner* — Manuel A Rivera Vargas
(74) *Attorney, Agent, or Firm* — Bayramoglu Law Offices LLC

(57) ABSTRACT

A method includes: pre-processing initial data of an acquired to-be-analyzed confrontation scenario, to obtain triplet data marked in a graph data structure, inputting the triplet data into a pre-trained analyzing model, to determine a result of analysis on semantic information of the to-be-analyzed confrontation scenario; wherein the analyzing model includes a plurality of operator networks that are provided with execution priorities, wherein the plurality of operator networks are configured for analyzing relations of different types; and the processing result of any one of the operator networks includes: in the relation type corresponding to the operator network, respective true relations of all of the node pairs, and confidences and descriptive values of the true relations; and according to the graph data structure that is updated by using the processing results of all of the operator networks, characterizing the result of analysis on the semantic information of the to-be-analyzed confrontation scenario.

9 Claims, 3 Drawing Sheets

METHOD AND APPARATUS FOR SEMANTIC ANALYSIS ON CONFRONTATION SCENARIO BASED ON TARGET-ATTRIBUTE-RELATION

CROSS REFERENCE TO THE RELATED APPLICATIONS

This application is the continuation application of International Application No. PCT/CN2023/106625, filed on Jul. 10, 2023, which is based upon and claims priority to Chinese Patent Application No. 202210573996.X, filed on May 25, 2022, the entire contents of which are incorporated herein by reference.

TECHNICAL FIELD

The embodiments of the present application relate to the technical field of data processing and more particularly, to a method and apparatus for semantic analysis on a confrontation scenario based on target-attribute-relation.

BACKGROUND

In confrontation scenarios, for example, scenarios of sport games or military activities, when it is required to determine the states of a plurality of target objects and the relations between the plurality of target objects, usually the method of artificial determination is used. However, a plurality of targets exist in the confrontation scenarios, and, in order to obtain an accurate determination result, it is required to increase the manpower, which consumes a large amount of manpower resource. Moreover, missed determination easily happens when artificial determination is used, which results in a poor accuracy of the obtained result of analysis on the confrontation scenario.

SUMMARY

The embodiments of the present application provide a method and apparatus for semantic analysis on a confrontation scenario based on target-attribute-relation, which aims at increasing the accuracy of the result of analysis on confrontation scenarios.

In the first aspect, an embodiment of the present application provides a method for semantic analysis on a confrontation scenario based on target-attribute-relation, wherein the method includes:
pre-processing initial data of an acquired to-be-analyzed confrontation scenario, to obtain triplet data marked in a graph data structure, wherein the triplet data include: a plurality of target nodes, an attribute of each of the target nodes and predicted relations between the target nodes;
inputting the triplet data into a pre-trained analyzing model, to determine a result of analysis on semantic information of the to-be-analyzed confrontation scenario;
wherein the analyzing model includes a plurality of operator networks that are provided with execution priorities, wherein the plurality of operator networks are configured for analyzing relations of different types;
wherein a process of processing of any one of the operator networks includes: according to a relation type processed thereby, selecting, from the plurality of target nodes, all of node pairs that satisfy the relation type, and determining respective processing data of all of the node pairs; and processing the processing data of all of the node pairs, and according to a processing result that is obtained by the processing, updating markers in the graph data structure;
wherein the processing data of the node pairs corresponding to the operator network having a more inferior priority include the processing result of the operator network having a more prior priority, and the processing result of any one of the operator networks includes:
in the relation type corresponding to the operator network, respective true relations of all of the node pairs, and confidences and descriptive values of the true relations; and
according to the graph data structure that is updated by using the processing results of all of the operator networks, characterizing the result of analysis on the semantic information of the to-be-analyzed confrontation scenario.

Optionally, the attribute of each of the target nodes includes a static attribute and a dynamic attribute, and the processing results of some of the operator networks further include the dynamic attributes of the target nodes; and
the step of, according to the processing result that is obtained by the processing, updating the markers in the graph data structure includes:
sending the dynamic attributes of the target nodes that are obtained by the processing by the some of the operator networks to the plurality of target nodes in the to-be-analyzed confrontation scenario, and updating the respective dynamic attributes of the plurality of target nodes.

Optionally, the analyzing model is trained by using the steps of:
acquiring simulated samples, and pre-training individual instances of the operator networks; and
acquiring truly marked samples, and performing joint training to all of the individual operator networks that are pre-trained, to obtain the analyzing model.

Optionally, the step of acquiring the simulated samples, and pre-training the individual instances of the operator networks includes:
pre-processing the acquired simulated samples that express relations of the same type, to obtain sample triplet data marked in the graph data structure, wherein the sample triplet data include: a plurality of target sample nodes, attributes corresponding to the plurality of target sample nodes individually, and true relations between the target sample nodes;
wherein each of the individual operator networks includes a data collating module and a data processing module, wherein
the data collating module is configured for determining the processing data of any one head-tail node pair in the plurality of target sample nodes, including an attribute of a sample head node, an attribute of a sample tail node, a neighbor relation of the sample head node, a neighbor relation of the sample tail node, a relation of the sample head node-the sample tail node, and a relation of the sample tail node-the sample head node; and
the data processing module includes:
a feature extracting network configured for extracting a head-tail node feature, a head-node-neighbor feature set, a tail-node-neighbor feature set, a feature set of a relation from a head node pointing to a tail node, and a feature set of a relation from a tail node pointing to a head node;

a feature transforming network configured for, according to the head-tail node feature, transforming the head-node-neighbor feature set, the tail-node-neighbor feature set, the feature set of the relation from the head node pointing to the tail node, and the feature set of the relation from the tail node pointing to the head node;

a feature integrating network configured for performing averaging and extending processing to an output of the feature transforming network; and a result outputting network configured for, according to an output of the feature integrating network, determining an outputted result of the individual operator network and marking in the graph data structure, wherein the outputted result includes: a confidence, a descriptive value and a dynamic attribute of the relation type; and based on an outputted result of the result outputting network, updating a parameter of the individual operator network.

Optionally, the step of acquiring the truly marked samples, and performing the joint training to all of the individual operator networks that are pre-trained, to obtain the analyzing model includes:

deciding execution priorities of all of the individual operator networks that are pre-trained;

acquiring and pre-processing true samples marked with a plurality of type relations, to obtain true triplet data marked in the graph data structure, wherein the true triplet data include a plurality of target true-sample nodes, attributes corresponding to the plurality of target true-sample nodes individually, and true relations between the target true-sample nodes;

by the operator network having a more prior priority, processing the respective processing data of all of the node pairs corresponding thereto, to obtain an outputted result and marking the outputted result in the graph data structure;

by the operator network having a more inferior priority, according to the relation type processed thereby and based on the outputted results of all of the operator networks having a more prior priority, determining and processing the respective processing data of all of the node pairs that satisfy the relation type, to obtain an outputted result and marking the outputted result in the graph data structure; and based on the outputted result of the individual operator network having a most inferior priority, updating a model parameter.

Optionally, when the individual operator networks are trained, joint optimization is used, wherein the result outputting network includes a confidence outputting network and a descriptive-value outputting network, a loss of the confidence outputting network is $L_{BCE,conf}$, a loss of the descriptive-value outputting network is $L_{MSE,edge}$, and a loss function of the individual operator network is:

$$L_{all}=\lambda_1 L_{BCE,conf}+\lambda_2 L_{MSE,edge}$$

the step of, based on the outputted result of the result outputting network, updating the parameter of the individual operator network includes:

based on a value of the loss function of the individual operator network, updating the parameter of the individual operator network.

Optionally, for any one of the operator networks, obtaining the outputted result and marking the outputted result in the graph data structure includes:

determining confidences in the outputted results obtained by any one of the operator networks one by one;

maintaining a relation in which the confidence is greater than a preset threshold, and marking the confidence of the relation and the descriptive value of the relation in the graph data structure; and deleting a relation in which the confidence is less than or equal to the preset threshold.

Optionally, in the joint training, obtaining the outputted result and marking the outputted result in the graph data structure includes:

after the result outputting network of the operator network having a more prior priority outputs the confidence of the head-tail node relation of each of the samples, using the confidence as a probability value with which the relation exists;

in a process of execution of the operator network having a more inferior priority, performing n times of sampling, wherein for an operator A having a more inferior priority, a true value of confi,A obtained in the i-th time is $\alpha$, wherein if the relation truly exists, $\alpha=1$, or else $\alpha=0$; and expressing an indicative function of the relation r used in this time of sampling as I(r), wherein if the relation r truly exists, I(r)=1, or else I(r)=0; and a formula for calculating a value $conf_r$ of a semi-supervised confidence of the relation r is:

$$\beta = \frac{1}{n}\sum_{i=1}^{n}\left[\left|\left|1-\alpha\right|-conf_{i,A}\right|*I(r)+\left|\alpha-conf_{i,A}\right|*(1-I(r))\right]$$

$$conf_r = \begin{cases} 1, & (\beta > \sigma) \\ 0, & (\beta < \sigma) \end{cases}$$

wherein $\sigma$ is a determination threshold.

In the second aspect, an embodiment of the present application provides an apparatus for semantic analysis on a confrontation scenario based on target-attribute-relation, wherein the apparatus includes:

a pre-processing module configured for pre-processing initial data of an acquired to-be-analyzed confrontation scenario, to obtain triplet data marked in a graph data structure, wherein the triplet data include: a plurality of target nodes, an attribute of each of the target nodes and predicted relations between the target nodes;

an inputting module configured for inputting the triplet data into a pre-trained analyzing model, to determine a result of analysis on semantic information of the to-be-analyzed confrontation scenario;

an analyzing model, including a plurality of operator networks that are provided with execution priorities, wherein the plurality of operator networks are configured for analyzing relations of different types;

wherein a process of processing of any one of the operator networks includes: according to a relation type processed thereby, selecting, from the plurality of target nodes, all of node pairs that satisfy the relation type, and determining respective processing data of all of the node pairs; and processing the processing data of all of the node pairs, and according to a processing result that is obtained by the processing, updating markers in the graph data structure;

wherein the processing data of the node pairs corresponding to the operator network having a more inferior priority include the processing result of the operator network having a more prior priority, and the processing result of any one of the operator networks includes: in the relation type corresponding to the operator network, respective true relations of all of the node pairs, and confidences and descriptive values of the true relations; and a result determining module configured for, according to the graph data structure that is updated by using the processing results of all of the operator networks, characterizing the result of analysis on the semantic information of the to-be-analyzed confrontation scenario.

Advantageous Effects

The method includes acquiring the initial data of the to-be-analyzed confrontation scenario, and pre-processing the initial data, to obtain triplet data marked in a graph data structure, wherein the triplet data include: a plurality of target nodes, an attribute of each of the target nodes and predicted relations between the target nodes; and subsequently, inputting the triplet data into a pre-trained analyzing model, to determine a result of analysis on semantic information of the to-be-analyzed confrontation scenario.

The analyzing model includes a plurality of operator networks that are provided with execution priorities, wherein the plurality of operator networks are configured for analyzing relations of different types. The process of processing of any one of the operator networks includes: according to a relation type processed thereby, selecting, from the plurality of target nodes, all of node pairs that satisfy the relation type, and determining respective processing data of all of the node pairs; and processing the processing data of all of the node pairs, and according to a processing result that is obtained by the processing, updating markers in the graph data structure. The processing data of the node pairs corresponding to the operator network having a more inferior priority include the processing result of the operator network having a more prior priority, and the processing result of any one of the operator networks includes: in the relation type corresponding to the operator network, respective true relations of all of the node pairs, and confidences and descriptive values of the true relations; and according to the graph data structure that is updated by using the processing results of all of the operator networks, characterizing the result of analysis on the semantic information of the to-be-analyzed confrontation scenario.

Firstly, in the method, the initial data of the confrontation scenario are processed into the triplet data in the graph data structure, and the result of analysis on the semantic information of the confrontation scenario that is finally obtained continues being marked in the graph data structure, which facilitates to intuitively and clearly demonstrate the attributes of the target nodes and the relations between the target nodes and describe the details of the relation by using descriptive values.

Secondly, the analyzing model of the method includes a plurality of operator networks, and each of the operator networks processes the relation of one type, which improves the diversity of the relation types that can be analyzed by the analyzing model. Furthermore, each of the operator networks focuses on the processing of the relation of one type, which can increase the accuracy of the determination on each of the types of the relations.

Subsequently, the plurality of operator networks of the analyzing model of the method are provided with execution priorities, and the operator network having a more inferior priority can be based on the processing result of the operator network having a more prior priority, which can, by referring to the interactions between the plurality of relations of the target nodes, further increase the accuracy of each of the types of the relations, and obtain a more accurate result of analysis on the semantic information. Subsequently, as compared with artificial observation and analysis on the confrontation scenario, the method obtains a more accurate result of analysis on the semantic information of the confrontation scenario.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present application, the figures that are required to describe the embodiments of the present application will be briefly described below. Apparently, the figures that are described below are embodiments of the present application, and a person skilled in the art can obtain other figures according to these figures without paying creative work.

DETAILED DESCRIPTION OF THE EMBODIMENTS

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In confrontation scenarios, for example, athletic sports or military activities, usually a plurality of targets exist, wherein the targets may be persons, and may also be objects used in the activities. Because there are many targets, the relations between the targets are very complicated, for example, a one-to-one confronting relation, a team cooperation relation, and a relation of team cooperation for confronting the other team. If the relations between the plurality of targets are artificially determined, it is required to consume a large amount of manpower resource, and, as restrained by the observation range and the energy of human being, erroneous determination or missed determination might easily happen.

In order to increase the accuracy of the result of analysis on confrontation scenarios, the present application provides a method for semantic analysis on a confrontation scenario based on target-attribute-relation. The semantic information refers to the data of the relations between a plurality of targets and the attributes of the targets themselves, and may facilitate the relevant personnel to quickly know the accurate information of the scene and make decision.

Figure 1:
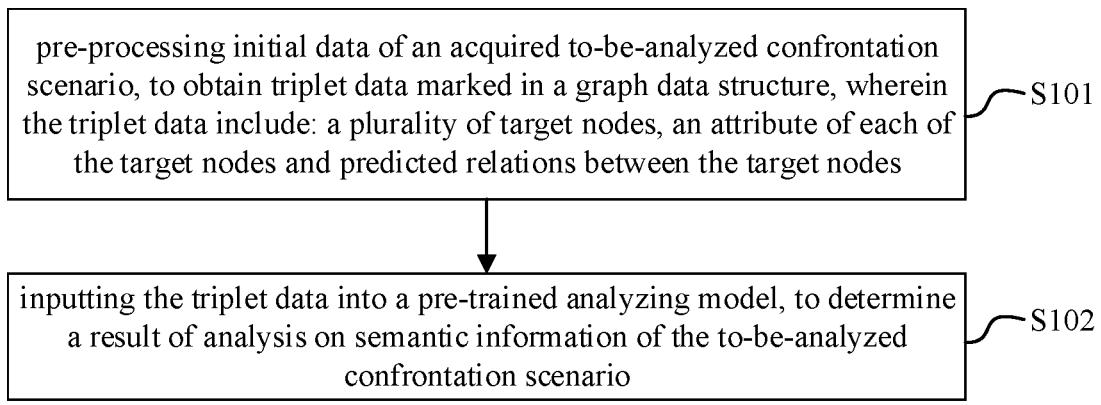
FIG. 1 is a flow chart of the steps of a method for semantic analysis on a confrontation scenario based on target-attribute-relation according to an embodiment of the present application.

Referring to FIG. 1, FIG. 1 shows a flow chart of the steps of a method for semantic analysis on a confrontation scenario based on target-attribute-relation according to an embodiment of the present disclosure. As shown in FIG. 1, the method may particularly include the following steps:

S101: pre-processing initial data of an acquired to-be-analyzed confrontation scenario, to obtain triplet data marked in a graph data structure, wherein the triplet data include: a plurality of target nodes, an attribute of each of the target nodes and predicted relations between the target nodes.

The targets according to the present embodiment include the persons and the significant objects in the confrontation scenario. As an example, in a football sport game, the targets include all of the players of both of the teams, the football and the two goals. All of the targets in the to-be-analyzed confrontation scenario form a target set O. The initial data of the to-be-analyzed confrontation scenario may be an image or video acquired by using a sensor such as a radar or a camera. The pre-processing of the acquired image or video further includes performing target detection and target tracking on the image or video to obtain the trajectory data of the plurality of targets.

Subsequently, the acquired initial data are pre-processed, to obtain triplet data marked in the graph data structure, wherein the triplet data include a plurality of target nodes, the attribute of each of the target nodes and the predicted relations between the target nodes.

The plurality of target nodes are embodied as a plurality of nodes in the graph data structure, and each of the target nodes correspondingly represents merely one target. For example, one node represents any one objective object among the players, the football and the goals.

The attribute of a target node is embodied in the form of a label value of the node in the graph data structure. Each of the target nodes contains a static attribute. The static attribute refers to the information that can be directly obtained from the initial data, and the static attribute can characterize the targets multi-dimensionally. The static attribute is expressed as $A_s \in R^{|O| \times n_s}$, wherein $|O|$ represents the quantity of the targets, and $n_s$ represents the dimensions of the static attribute.

For example, in a football game, the static attribute of a target node characterizing a player includes the team that the player belongs to, the basic data of the player (for example, the name, the number or the position in the field) and the current position of the player. The static attribute of the target node characterizing the football includes the current position of the football. As an example, when the initial data are a video, the current position of the target may be the position coordinates of the latest N frames.

The attribute of a target node characterizing a person further includes a dynamic attribute. The dynamic attribute refers to the attribute that might be executed and processed and might change according to the subsequent processing result. The content characterized by the dynamic attribute may be customized in practical applications. The dynamic attribute also may characterize the characteristics of the player multi-dimensionally. The dynamic attribute is expressed as $A_d \in R^{|O| \times n_d}$, wherein $|O|$ represents the quantity of the targets, and $n_d$ represents the dimensions of the dynamic attribute.

As an example, in a football game, the dynamic attribute of a target node characterizing a player may include a danger degree and a fatigue degree. The danger degree can quantize the effective outputs such as the degree of defense of the player to the opposing players or the degree of danger of the player to the opposing goal. The fatigue degree quantizes the state of the physical capability of the player.

The relations between the target nodes are expressed as the side between two target nodes in the graph data structure. Each of the relations contains the confidence, the type, a head-tail-node pointer and the descriptive value. The confidence may be used to characterize the degree of truth of the relation, and the confidence is expressed as $conf \in [0,1]$, wherein a higher confidence represents a higher degree of truth of the relation between two target nodes. The type is used to represent what type the relation is. The head-tail-node pointer represents the initiating part and the receiving part in the relation. The descriptive value is used to describe the particular details of the relation multi-dimensionally. The descriptive value is expressed as $v \in R^{n_r}$, wherein $n_r$ represents the dimension of the descriptive value of the relation of the type of r. The content represented by each of the dimensions of the descriptive value may be customized. For the descriptive values of the relations of different types, the dimensions and the contents represented by the dimensions also may be different.

As an example, in a football game, a side connecting a target node A and a target node B represents the relation of the type of defense. Moreover, the target node A is a head node $O_h$, and the target node B is a tail node $O_t$; in other words, the head-tail-node pointer points to the target node B from the target node A. Therefore, the semantics expressed by it is actually that the target A is defending the target B. The first dimension of the descriptive value may represent the degree of the defense of the player represented by the target node A to the player represented by the target node B, and the second dimension may represent the distance between the two persons.

Regarding the to-be-analyzed confrontation scenario, predicted relations between the target nodes are assumed in advance; in other words, firstly, the sides corresponding to a plurality of relation types are connected between any two target nodes. The predicted relations may contain the type and the head-tail-node pointer, and may not contain the confidence and the descriptive value. By using the analyzing model, the confidence of each of the predicted relations is analyzed and determined, merely the relations in which the confidence is greater than a confidence threshold are maintained, and the relations that actually do not exist in the predicted relations are deleted.

S102: inputting the triplet data into a pre-trained analyzing model, to determine a result of analysis on semantic information of the to-be-analyzed confrontation scenario.

The analyzing model includes a plurality of operator networks that are provided with execution priorities, wherein the plurality of operator networks are configured for analyzing relations of different types; in other words, one operator network corresponds to one relation type. In the provision of the priorities of the operator networks, the priority of the operator network corresponding to a simpler relation is more prior, and the priority of the operator network corresponding to a more complicated relation is more inferior.

In the method, each of the operator networks processes the relation of one type, which can improve the diversity of the relation types that can be analyzed by the analyzing model. Furthermore, each of the operator networks focuses on the processing of the relation of one type, which can increase the accuracy of each of the types of the relations.

The process of processing of any one of the operator networks includes the following steps:

S1021: according to a relation type processed thereby, selecting, from the plurality of target nodes, all of node pairs that satisfy the relation type.

Because the subjects that generate the relations processed by the operator networks are different, or, in other words, the subjects that generate some of the relations are person-person, and the subjects that generate some of the relations are person-object, any one of the operator networks is required to, from the plurality of target nodes, select all of the node pairs that satisfy the requirements on the subjects of the relation types.

When any one of the operator networks is trained, the samples of the relation types corresponding to each of the operator networks are used. Therefore, the types of the target nodes processed by one operator network are prescribed in advance. For example, in one node pair processed by the operator network corresponding to the relation of defense, both of the two target nodes are nodes representing a player, and the players represented by the two target nodes belong to the different teams. In one node pair processed by the operator network corresponding to the relation of cooperation, both of the two target nodes are nodes representing a player, and the players represented by the two target nodes belong to the same one team. In one node pair processed by the operator network corresponding to the relation of shooting, one of the target nodes represents a player, and one of the target nodes represents the football.

S1022: determining respective processing data of all of the node pairs.

Any one of the operator networks, after selecting all of the node pairs that are required to be processed by itself, are further required to determine the structures of the processing data corresponding to all of the node pairs individually.

In an alternative embodiment, the processing data of any one of the node pairs include: the static attribute of the head node, the dynamic attribute of the head node, the static attribute of the tail node, the dynamic attribute of the tail node, the neighbor relation of the head node, the neighbor relation of the tail node, the relation of the head node-the tail node, and the relation of the tail node-the head node.

When an operator network is processing one node pair, the head node and the tail node in the node pair are definite. For example, an operator network is used to process the relation type R, and the targets represented by the target node A and the target node B satisfy the requirements on the subject of that relation type. Because, at the stage of application, it is assumed in advance that the relation R exists from the target node A to the target node B, and it is also assumed that the relation R exists from the target node B to the target node A, in the processing, the target node A (the head node)-the target node B (the tail node) is one node pair, and the target node B (the head node)-the target node A (the tail node) is another node pair.

The neighbor relation of the head node refers to the relations between the head node and the points around it except the tail node. The neighbor relation of the tail node refers to the relations between the tail node and the points around it except the head node. Regarding any one of the nodes, in the current frame image of the image or video, a plurality of targets appear simultaneously with the node, all of which are its neighboring nodes except the tail node. The relation of the head node-the tail node refers to the other relations from the head node to the tail node than the relation that is currently being processed. The relation of the tail node-the head node refers to the other relations from the tail node to the head node than the relation that is currently being processed.

S1023: processing the processing data of all of the node pairs, and according to a processing result that is obtained by the processing, updating markers in the graph data structure.

The processing result of any one of the operator networks includes: in the relation type corresponding to the operator network, respective true relations of all of the node pairs, and confidences and descriptive values of the true relations. In other words, each of the processed node pairs obtains a processing result. Subsequently, the true relation of the node pair can be determined, and the confidence and the descriptive value of that true relation may be marked in the graph data structure.

As an example, in an embodiment, the predicted relation R exists between the target node A and the target node B, and after the processing by the operator network, the confidence of the predicted relation R is obtained. If the confidence is greater than a calibrated value, then that indicates that the predicted relation R is a true relation, the side of the predicted relation R in the graph data structure is maintained, and the obtained confidence and descriptive value are marked to the side. If the confidence is less than the calibrated value, then that indicates that the predicted relation R is a false relation, and the side of the predicted relation R in the graph data structure that was connected in advance is deleted.

The processing results of some of the operator networks further include the dynamic attributes of the target nodes. For example, in the processing of the relation of shooting, an additional characteristic obtained by the operator network by calculation characterizes the shooting danger degree of the target node.

In the updating of the markers in the graph data structure according to the processing result, a broadcasting mechanism is employed to the dynamic attribute of any one of the nodes. In other words, the dynamic attribute of the target node is sent to the plurality of target nodes in the to-be-analyzed confrontation scenario, and the respective dynamic attributes of the plurality of target nodes are updated, which can enable the other target nodes to know. That is because, if the other nodes know the shooting danger degree of the player of a certain target node, this time of shooting and the danger degree might influence the attributes of the other nodes or the relations between the nodes.

It should be noted that, because the plurality of operator networks in the analyzing model are provided with execution priorities, the processing data of the node pairs corresponding to the operator network having a more inferior priority include the processing result of the operator network having a more prior priority. In other words, the operator network having a more inferior priority, in the processing, is based on the graph data structure that is updated by using the processing result previously obtained. For example, when the operator network having a more inferior priority is determining the processing data of the node pair, the dynamic attributes of the nodes, the other relations with the other nodes and so on may be based on the various true relations that are obtained by the processing previously and the dynamic attributes of the nodes that are updated.

In implementations, the processing data of the operator network having a more inferior priority may include the processing results of all of the operator networks having a more prior priority; in other words, the determination on the relation that is processed subsequently is based on all of the relations that are completely determined previously. Optionally, the processing data of the operator network having a more inferior priority contain the processing results of some of the operator networks having a more prior priority. That depends on the degree of association between the relations. The degree of association characterizes whether the relations have an intersection set therebetween or the interaction between the relations. For example, the relations that are completely determined previously include the relation a, the relation b, the relation c and the relations d, the relation A that is processed subsequently has a certain degree of association with the relation a, the relation b and the relation c. Accordingly, the determination on the relation A that is processed subsequently is based on the processing results of the relation a, the relation b and the relation c.

The method, by taking into consideration the interaction between the relations in the determination on one of the relations, can further increase the accuracy of each of the types of the relations.

After all of the operator networks have completely processed, the graph data structure that is updated by using the processing results of all of the operator networks can characterize the result of analysis on the semantic information of the to-be-analyzed confrontation scenario. The nodes and the sides in the graph data structure can characterize the attributes of the targets, the plurality of relations between the targets, and the details of the relations.

In the method, in the analysis on the semantic information of the to-be-analyzed confrontation scenario, the inputted data are the triplet data in the graph data structure, the outputted analysis result is marked in the graph data structure, the label values of the nodes represent the attributes of the targets, and the sides between the nodes represent the relations between the targets, which can intuitively embody the semantic information of the confrontation scenario. As compared with artificial observation and analysis on the confrontation scenario, the method obtains a more accurate result of analysis on the semantic information of the confrontation scenario.

Figure 2:
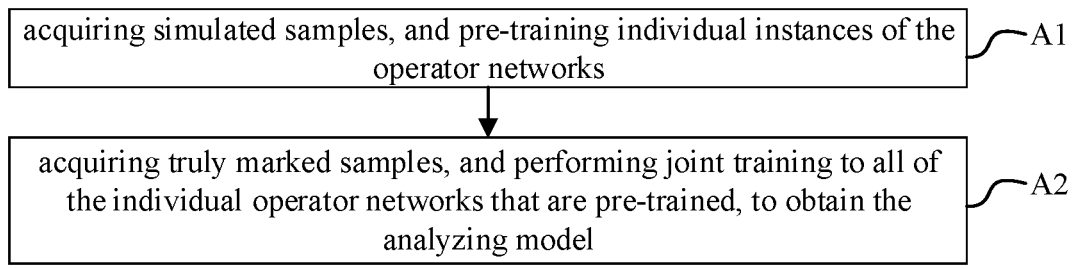
FIG. 2 is a flow chart of the steps of a method for training the analyzing model according to an embodiment of the present application.

Referring to FIG. 2, FIG. 2 shows a flow chart of the steps of a method for training the analyzing model according to an embodiment of the present application. The training method includes the following steps:

A1: acquiring simulated samples, and pre-training individual instances of the operator networks; and A2: acquiring truly marked samples, and performing joint training to all of the individual operator networks that are pre-trained, to obtain the analyzing model.

Firstly, each of the individual operator networks is pre-trained, to cause each of the operator networks to learn to process the relation of one type. Subsequently, according to truly marked samples, joint training is performed on all of the individual operator networks, so that the plurality of operator networks are trained in the order of the priorities, thereby obtaining the analyzing model.

The step A1 of pre-training the individual operator networks includes the following sub-steps:

A11: pre-processing the acquired simulated samples that express relations of the same type, to obtain sample triplet data marked in the graph data structure, wherein the sample triplet data include: a plurality of target sample nodes, attributes corresponding to the plurality of target sample nodes individually, and true relations between the target sample nodes.

According to the relation types that are correspondingly processed by different individual operator networks, the simulated samples that express the same one relation type are acquired, wherein the simulated samples of the operator networks are different. The simulated samples are pre-processed, to obtain sample triplet data marked in the graph data structure.

Referring to the description on the step S101, in the graph data structure, the target sample nodes represent the sample targets, the label values of the nodes are the attributes corresponding to the sample targets, the attributes include a static attribute and a dynamic attribute, the sides connecting the target sample nodes represent the relations, and the label values of the sides include the confidence, the type, the head-tail-node pointer and the descriptive value.

When the operator networks are constructed, each of the individual operator networks includes a data collating module and a data processing module, wherein A12: the data collating module is configured for determining the processing data of any one head-tail node pair in the plurality of target sample nodes, including an attribute of a sample head node, an attribute of a sample tail node, a neighbor relation of the sample head node, a neighbor relation of the sample tail node, a relation of the sample head node-the sample tail node, and a relation of the sample tail node-the sample head node.

Because the individual operator networks individually correspond to the simulated samples expressing one relation type, all of the target sample nodes in the simulated samples are nodes that satisfy that relation type. Therefore, the processing data of any one head-tail node pair in the plurality of target sample nodes can be directly determined.

The attribute of the sample head node includes the static attribute $o_h \cdot a_s$ and the dynamic attribute $o_h \cdot a_d$.

The attribute of the sample tail node includes the static attribute $o_t \cdot a_s$ and the dynamic attribute $o_t \cdot a_d$.

The neighboring nodes of the sample head node refer to the other nodes than the tail node, and are expressed as $o_{h,i}$. The neighbor relation of the sample head node includes: the static attribute $o_{h,i} \cdot a_s$ and the dynamic attribute $o_{h,i} \cdot a_d$ of each of the neighboring nodes, and the descriptive value $r_{h,i} \cdot v$ of the relation of each of the neighboring nodes to the sample head node. The neighbor relation of the sample head node is expressed as: $(o_{h,i} \cdot a_s, o_{h,i} \cdot a_d, r_{h,i} \cdot v)|r_{h,i} \in R_h$, wherein $R_h$ refers to a set of the relations of the neighboring nodes to the sample head node.

The neighboring nodes of the sample tail node refer to the other nodes than the head node, and are expressed as $o_{t,j}$. The neighbor relation of the sample tail node includes: the static attribute $o_{t,j} \cdot a_s$ and the dynamic attribute $o_{t,j} \cdot a_d$ of each of the neighboring nodes, and the descriptive value $r_{t,j} \cdot v$ of the relation of each of the neighboring nodes to the sample tail node. The neighbor relation of the sample tail node is expressed as: $(o_{t,j} \cdot a_s, o_{t,j} \cdot a_d, r_{t,j} \cdot v)|r_{t,j} \in R_t$, wherein $R_t$ refers to a set of the relations of the neighboring nodes to the sample tail node.

The relation of the sample head node-the sample tail node refers to the descriptive values of all of the relations from the sample head node pointing to the sample tail node. However, in the pre-training of the individual operator networks, the simulated samples are not marked with the relations of the other types, and therefore the inputted value may be 0. In another embodiment, when the individual operator networks are trained, the other relations from the sample head node to the sample tail node may also be marked in the simulated samples. The relation of the sample head node-the sample tail node is expressed as $(r_i \cdot v)|r_i \in R_{ht}$, wherein $R_{ht}$ refers to a set of all of the relations from the sample head node pointing to the sample tail node.

Likewise, the relation of the sample tail node-the sample head node refers to the descriptive values of all of the relations from the sample tail node pointing to the sample head node, and is expressed as $(r_j \cdot v)|r_j \in R_{th}$, wherein $R_{th}$ refers to a set of all of the relations from the sample tail node pointing to the sample head node.

The part of an individual operator that is used to process the data is the data processing module. The data processing module is constructed by using a simplified neural network, and unifies the networks used in the processing into a sub-network formed by fully connected layers, which is expressed as ExpNet. For an ExpNet, it is merely required to prescribe its layer quantity L and the inputting and outputting dimensions $d_{in}, d_{out}$, and the outputting dimension of its i-th intermediate layer is obtained by calculating by using the following formula, and the inputting dimension is the outputting dimension of the (i−1)-th layer, and is expressed as:

$$d_i = d_{in} * \left(\frac{d_{out}}{d_{in}}\right)^{\frac{i}{L}}.$$

Except the last one layer, each of the layers employs the relu activation function.

Figure 3:
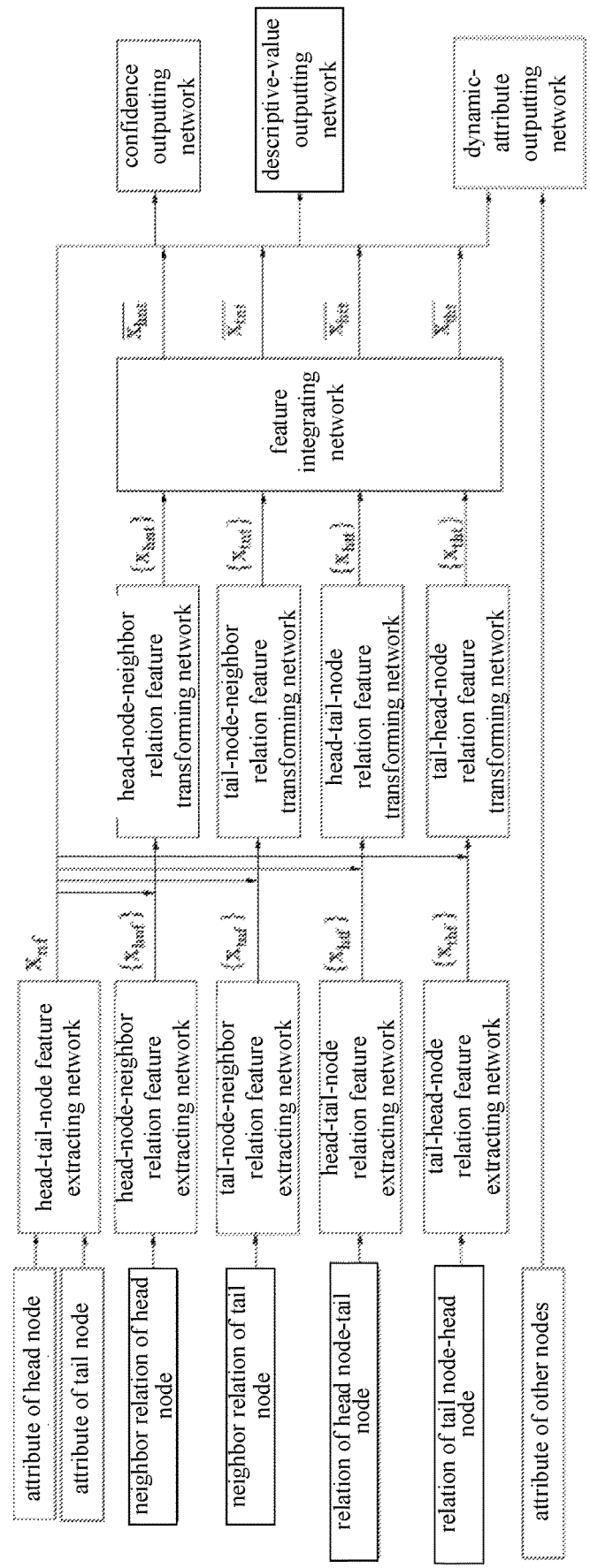
FIG. 3 is a schematic diagram of the process of data processing of an operator network according to an embodiment of the present application.

Referring to FIG. 3, FIG. 3 shows a schematic diagram of the process of data processing of an operator network according to the present application. In the present embodiment, one of the operator networks includes four layers, which are a feature extracting network, a feature transforming network, a feature integrating network and a result outputting network.

The processing process is particularly as follows:

A13: by a feature extracting network, extracting a head-tail node feature, a head-node-neighbor feature set, a tail-node-neighbor feature set, a feature set of a relation from a head node pointing to a tail node, and a feature set of a relation from a tail node pointing to a head node.

The feature extracting network includes one head-tail-node feature extracting network and four relation feature extracting networks.

Regarding the head-tail-node feature extracting network ExpNe$_{mf}$, its input is the attribute of the sample head node and the attribute of the sample tail node, and is expressed as $(o_h \cdot a_s, o_h \cdot a_d, o_t \cdot a_s, o_t \cdot a_d)$, and its outputs is a head-tail-node feature vector $x_{nf}$.

The four relation feature extracting networks are as follows:

Regarding the head-node-neighbor relation feature extracting network ExpNet$_{hnf}$, its input is the neighbor relation of the sample head node, i.e., $(o_{h,i} \cdot a_s, o_{h,i} \cdot a_d, r_{h,i} \cdot v)$, and if the sample head node has $n_h$ neighboring nodes, then the output is the head-node-neighbor feature set containing $n_h$ characteristic vectors $\{x_{hnf}\}$.

Regarding the tail-node-neighbor relation feature extracting network ExpNet$_{tnf}$, its input is the neighbor relation of the sample tail node, i.e., $(o_{t,j} \cdot a_s, o_{t,j} \cdot a_d, r_{t,j} \cdot v)$, and if the sample tail node has $n_t$ neighboring nodes, then the output is the tail-node-neighbor feature set containing $n_t$ characteristic vectors $\{x_{tnf}\}$.

Regarding the head-tail-node relation feature extracting network ExpNet$_{htf}$, its input is the relation of the sample head node-the sample tail node $(r_i \cdot v)$, and its output is the feature set of the relation from the head node pointing to the tail node containing i characteristic vectors $\{x_{htf}\}$.

Regarding the tail-head-node relation feature extracting network ExpNet$_{thf}$, its input is the relation of the sample tail node-the sample head node $(r_j \cdot v)$, and its output is the feature set of the relation from the tail node pointing to the head node containing j characteristic vectors $\{x_{thf}\}$.

A14: by a feature transforming network, according to the head-tail node feature, transforming the head-node-neighbor feature set, the tail-node-neighbor feature set, the feature set of the relation from the head node pointing to the tail node, and the feature set of the relation from the tail node pointing to the head node.

The feature transforming network includes four relation feature transforming networks:

Regarding the head-node-neighbor relation feature transforming network ExpNet$_{hnt}$, its input is the head-tail-node feature vector $x_{nf}$ and the head-node-neighbor feature set $\{x_{hnf}\}$, and its output is still the head-node-neighbor feature transforming set $\{x_{hnt}\}$ having $n_h$ vectors.

Regarding the tail-node-neighbor relation feature transforming network ExpNet$_{tnt}$, its input is the head-tail-node feature vector $x_{nf}$ and the tail-node-neighbor feature set $\{x_{tnf}\}$, and its output is still the tail-node-neighbor feature transforming set $\{x_{tnt}\}$ having $n_t$ vectors.

Regarding the head-tail-node relation feature transforming network ExpNet$_{htt}$, its input is the head-tail-node feature vector $x_{nf}$ and the feature set of the relation from the head node pointing to the tail node $\{x_{htf}\}$, and its output is the feature transforming set of the relation from the head node pointing to the tail node containing i vectors $\{x_{htt}\}$.

Regarding the head-tail-node relation feature transforming network ExpNet$_{tht}$, its input is the head-tail-node feature vector $x_{nf}$ and the feature set of the relation from the tail node pointing to the head node $\{x_{thf}\}$, and its output is the feature transforming set of the relation from the head node pointing to the tail node containing j vectors $\{x_{tht}\}$.

A15: by a feature integrating network, performing averaging and extending processing to an output of the feature transforming network.

The feature integrating network is used to average the four feature transforming sets outputted by the feature transforming network. After the averaging of each of the feature transforming sets, one characteristic vector is obtained. Subsequently, the feature integrating network performs extension processing to the four obtained characteristic vectors, i.e., extending the vectors by one bit, wherein the numerical values of the extend bits are the quantities of the vectors in the feature transforming sets.

As an example, the head-node-neighbor feature transforming set $\{x_{hnt}\}$ includes $n_h$ vectors, and the feature integrating network averages the $n_h$ vectors to obtain one characteristic vector, and subsequently extends the obtained vector by one bit, wherein the value of the extend bit is $n_h$.

The four feature transforming sets outputted by the feature transforming network $\{x_{hnt}\}$, $\{x_{tnt}\}$, $\{x_{htt}\}$ and $\{x_{tht}\}$, after processed by the feature integrating network, are $\overline{x}_{hnt}$, $\overline{x}_{tnt}$, $\overline{x}_{htt}$ and $\overline{x}_{tht}$, respectively.

A16: by a result outputting network, according to an output of the feature integrating network, determining an outputted result of the individual operator network and marking in the graph data structure, wherein the outputted result includes: a confidence, a descriptive value and a dynamic attribute of the relation type.

The result outputting network includes three networks, which are the confidence outputting network $ExpNet_{conf}$, the descriptive-value outputting network $ExpNet_{desc}$ and the dynamic-attribute outputting network $ExpNet_{broadcast}$.

The input of the confidence outputting network $ExpNet_{conf}$ is $(x_{nf}, \overline{x_{hnt}}, \overline{x_{tnt}}, \overline{x_{htt}}, \overline{x_{tht}})$, and $ExpNet_{conf}$ is added a sigmoid activation function, and accordingly outputs a scalar value between 0 and 1 as the confidence.

The input of the descriptive-value outputting network $ExpNet_{desc}$ is $(x_{nf}, \overline{x_{hnt}}, \overline{x_{tnt}}, \overline{x_{htt}}, \overline{x_{tht}})$, and it outputs a vector of specified dimensions as the descriptive value of the relation.

The input of the dynamic-attribute outputting network $ExpNet_{broadcast}$ is $(x_{nf}, \overline{x_{hnt}}, \overline{x_{tnt}}, \overline{x_{htt}}, \overline{x_{tht}}, o_i \cdot a_s, o_i \cdot a_d)$, wherein $o_i \cdot a_s, o_i \cdot a_d$ are the static attribute and the dynamic attribute of the sample node $O_i$ respectively, the outputting dimension is the same as $o_i \cdot a_d$, and the dynamic attribute of the node $O_i$ is directly replaced with the output of $ExpNet_{broadcast}$.

Because the confidence outputting network $ExpNet_{conf}$ employs the sigmoid activation function, a dichotomous cross-entropy loss function is employed, whose loss is expressed as $L_{BCE,conf}$. However, the descriptive-value outputting network $ExpNet_{desc}$ employs the relu activation function, and therefore a simple mean-square-error loss function is employed, whose loss is expressed as $L_{MSE,edge}$.

In the training of the individual operator networks, taking into consideration that the confidence outputting network and the descriptive-value outputting network share the above-described networks, joint optimization may be used, wherein the loss function is as follows:

$$L_{all} = \lambda_1 L_{BCE,conf} + \lambda_2 L_{MSE,edge}$$

wherein $\lambda 1$ and $\lambda 2$ are the loss weights of the confidence outputting network and the descriptive-value outputting network respectively.

Regarding the operator networks whose processing result includes the dynamic attribute, in the training of the dynamic-attribute outputting network, because the data are different from the data used in the above two outputs, and joint optimization is difficult, it is separately trained.

Taking into consideration that the output of the dynamic attribute directly modifies the dynamic attribute $a_d$ of the node, and the operation is essentially $a_d \rightarrow a'_d = a_d + \Delta a_d$, the networks may be caused to learn the residual error $\Delta a_d$, and the label of the training data should be the difference between the new dynamic attribute and the original dynamic attribute. Correspondingly, in the deduction, the output $output_{broadcast}$ of the dynamic attribute plus the original dynamic attribute should be used as the new dynamic attribute of the node, and therefore the loss function is the default MSE, i.e., $$L_{broadcast} = MSE(\Delta a_d, output_{broadcast})$$

Based on the value of the loss function of the individual operator network, the parameter of the individual operator network is updated, till the value of the loss function of the individual operator network is less than a calibrated loss value, and it is determined that the pre-training of the individual operator network is completed.

When the individual operator networks are marking in the graph data structure according to the outputted result, two mechanisms may be employed. One of the mechanisms is the hard determination, which includes determining confidences in the outputted results obtained by any one of the operator networks one by one; maintaining a relation in which the confidence is greater than a preset threshold, and marking the confidence of the relation and the descriptive value of the relation in the graph data structure; and deleting a relation in which the confidence is less than or equal to the preset threshold.

The other of the mechanisms is the soft determination, which includes using the confidence as a probability value with which the relation exists. The joint training of all of the individual operator networks that are pre-trained employs the soft determination. In an alternative embodiment, the step A2 of the joint training includes:

A21: deciding execution priorities of all of the individual operator networks that are pre-trained.

Generally, the priority of the operator network corresponding to a simpler relation is more prior, the priority of the operator network corresponding to a more complicated relation is more inferior, the executions of the operator networks are independent of each other, and, within the same one duration, the plurality of operator networks may be executed.

A22: acquiring and pre-processing true samples marked with a plurality of type relations, to obtain true triplet data marked in the graph data structure, wherein the true triplet data include a plurality of target true-sample nodes, attributes corresponding to the plurality of target true-sample nodes individually, and true relations between the target true-sample nodes.

The true samples are pre-processed, to obtain true triplet data marked in the graph data structure. Furthermore, all of the true relations between the target true-sample nodes are the relations that truly exist, and the value of the confidence conf of the relations is determined to be 1 by using artificial marking, whereby joint training can be performed to all of the operator networks according to the definite true samples, to obtain the analyzing model.

A23: by the operator network having a more prior priority, processing the respective processing data of all of the node pairs corresponding thereto, to obtain an outputted result and marking the outputted result in the graph data structure.

A24: by the operator network having a more inferior priority, according to the relation type processed thereby and based on the outputted results of all of the operator networks having a more prior priority, determining and processing the respective processing data of all of the node pairs that satisfy the relation type, to obtain an outputted result and marking the outputted result in the graph data structure.

After each of the operators processes according to the priorities to obtain the outputted result, the markers in the graph data structure are updated according to the outputted result. In the joint training, when the individual operator networks are marking in the graph data structure according to the outputted result, the soft determination is employed, i.e., maintaining the side corresponding to each of the relations, and using each of the confidences as the probability value with which the relation exists.

The processing by the operator network having a more inferior priority includes, for all of the relations contained in the graph data structure, performing n times of sampling, wherein for an operator A having a more inferior priority, a true value of conf,A obtained in the i-th time is $\alpha$, wherein if the relation truly exists, $\alpha=1$, or else $\alpha=0$; and expressing an indicative function of the relation r used in this time of sampling as $I(r)$, wherein if the relation r truly exists, $I(r)=1$, or else I(r)=0; and a formula for calculating a value $conf_r$ of a semi-supervised confidence of the relation r is:

$$\beta = \frac{1}{n}\sum_{i=1}^{n}[||1-\alpha|-conf_{i,A}|*I(r)+|\alpha-conf_{i,A}|*(1-I(r))]$$

$$conf_r = \begin{cases} 1, & (\beta > \sigma) \\ 0, & (\beta < \sigma) \end{cases}$$

wherein σ is a determination threshold, and σ is generally 0.5.

One advantage of organizing data in the form of the ternary group of target, attribute and relation is that the plurality of operators can have association with each other. For example, the processing by the operator network having a more inferior priority can be based on the processing result of the operator network having a more prior priority. Moreover, the advantage is also embodied in that, in the training, the operator of a more complicated relation can provide supervision to the operator of a simpler relation to a certain extent.

In practical applications, the label data of the samples are usually not sufficient, and some relations lack. Therefore, a mode combining the single-operator training and the multi-operator training may be used. In other words, firstly, each of the operators is separately pre-trained by using some of the data or simulated data, to obtain the operators that are pre-trained, and then the method of multi-operator semi-supervised learning is employed by using the outputted result and the label, which can greatly subsequently execute the processing data of the operators, thereby obtaining the operators that are sufficiently trained when the label data are not sufficient.

A25: based on the outputted result of the individual operator network having a most inferior priority, updating a model parameter.

In the practical implementations, the model parameter may be updated according to the value(s) of the loss function(s) of the one or more operator networks that is (are) finally executed, and when all of the operator networks are trained to the predetermined state, the analyzing model that is completely trained is obtained.

The present application has at least the following advantageous effects:

1. As compared with artificial observation and analysis on the confrontation scenario, the method obtains a more accurate result of analysis on the semantic information of the confrontation scenario.

2. By organizing the data of all of the initial data of the confrontation scenario and the result of analysis on the semantic information obtained by analysis in the form of target, attribute and relation in the graph data structure, the semantic information can be intuitively embodied, i.e., the attributes of the targets and the relations between the targets.

3. The data processing by the operator network having a more inferior priority can be based on the processing result of the operator network having a more prior priority, and, by referring to the interactions between the plurality of relations of the target nodes, a more accurate result of analysis on the semantic information is obtained.

4. Each of the operator networks focuses on the processing of the relation of one type, which can increase the accuracy of each of the types of the relations, and has a higher calculation efficiency.

Figure 4:
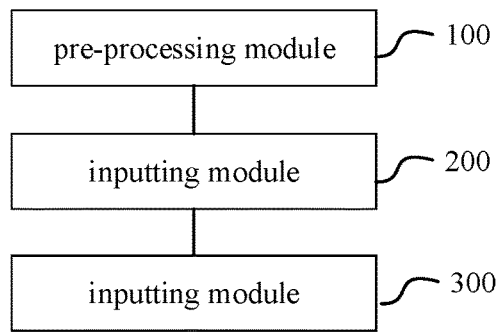
FIG. 4 is a functional module diagram of an apparatus for semantic analysis on a confrontation scenario based on target-attribute-relation according to an embodiment of the present application.

Referring to FIG. 4, FIG. 4 shows a functional module diagram of an apparatus for semantic analysis on a confrontation scenario based on target-attribute-relation according to an embodiment of the present disclosure. As shown in FIG. 4, the apparatus includes:

a pre-processing module 100 configured for pre-processing initial data of an acquired to-be-analyzed confrontation scenario, to obtain triplet data marked in a graph data structure, wherein the triplet data include: a plurality of target nodes, an attribute of each of the target nodes and predicted relations between the target nodes;

an inputting module 200 configured for inputting the triplet data into a pre-trained analyzing model, to determine a result of analysis on semantic information of the to-be-analyzed confrontation scenario; and an analyzing model 300, including a plurality of operator networks that are provided with execution priorities, wherein the plurality of operator networks are configured for analyzing relations of different types;

wherein a process of processing of any one of the operator networks includes: according to a relation type processed thereby, selecting, from the plurality of target nodes, all of node pairs that satisfy the relation type, and determining respective processing data of all of the node pairs; and processing the processing data of all of the node pairs, and according to a processing result that is obtained by the processing, updating markers in the graph data structure;

wherein the processing data of the node pairs corresponding to the operator network having a more inferior priority include the processing result of the operator network having a more prior priority, and the processing result of any one of the operator networks includes: in the relation type corresponding to the operator network, respective true relations of all of the node pairs, and confidences and descriptive values of the true relations; and according to the graph data structure that is updated by using the processing results of all of the operator networks, characterizing the result of analysis on the semantic information of the to-be-analyzed confrontation scenario.

An embodiment of the present application further provides a computer-readable storage medium, wherein the computer-readable storage medium stores a computer program, and the computer program, when executed by a processor, implements the method for semantic analysis on a confrontation scenario based on target-attribute-relation according to the embodiments.

The device embodiments described above are only schematic, where the units described as separate components can be or may not be physically separated, and the components displayed as units can be or may not be physical units, that is, they can be located in one place or distributed across multiple network units. Some or all modules can be selected according to actual needs to achieve the purpose of the embodiment. Ordinary technical personnel in this field can understand and implement without creative labor.

The embodiments of various components disclosed in the present disclosure can be implemented in hardware, software modules running on one or more processors, or a combination of them. Persons skilled in the art should understand that microprocessors or digital signal processors (DSP) can be used in practice to achieve some or all functions of some or all components in the computing and processing device according to the embodiments of the present disclosure. The present disclosure can also be implemented as a device or device program (such as a computer program and a computer program product) for executing some or all of the methods described herein. This implementation of the program of the present disclosure can be stored on a computer-readable medium or can take the form of one or more signals. Such signals can be downloaded from internet websites, provided on carrier signals, or in any other form.

Figure 5:
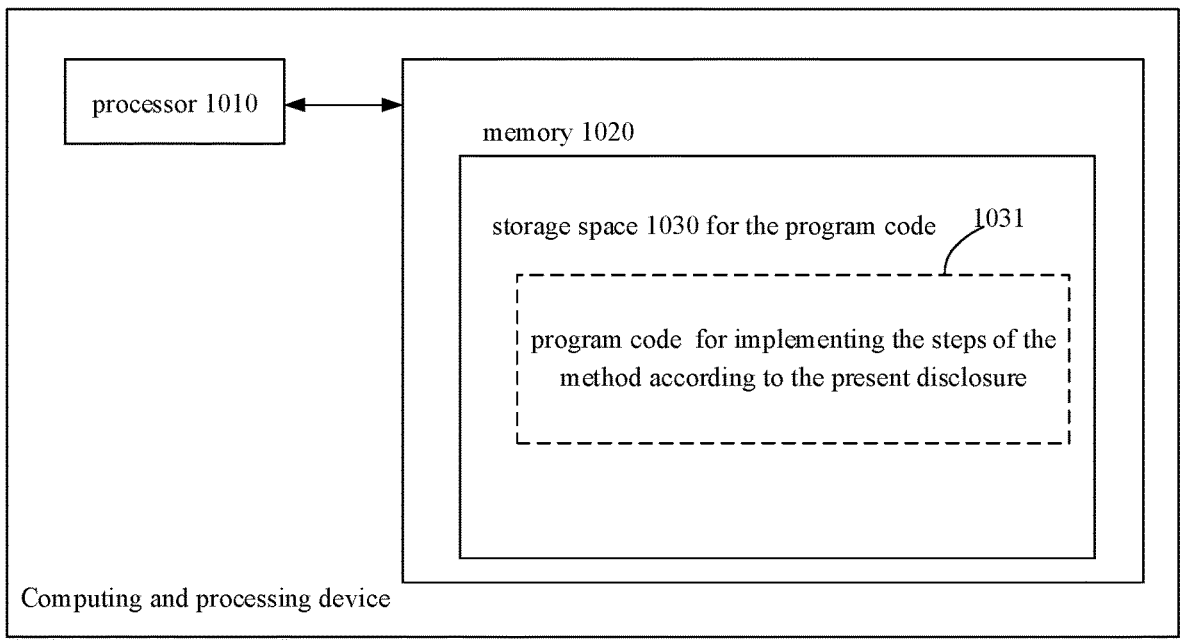
FIG. 5 schematically illustrates a block diagram of a computing and processing device for executing a method according to the present disclosure.
Figure 6:
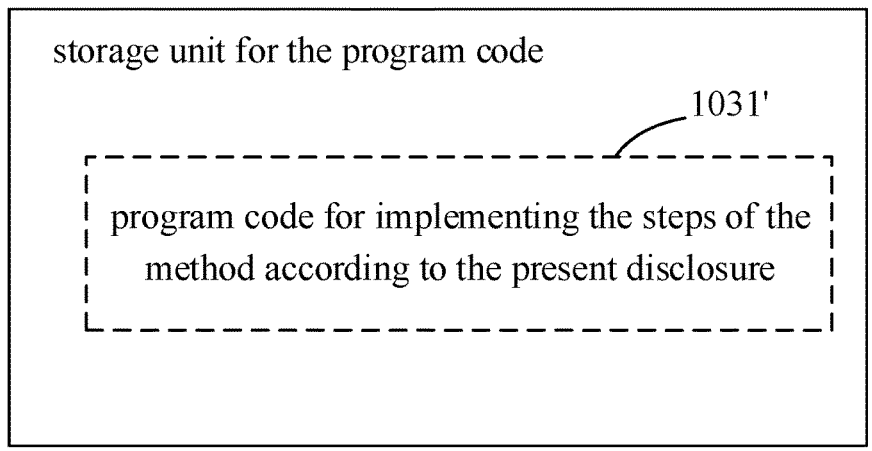
FIG. 6 schematically illustrates a storage unit for holding or carrying program code implementing the method according to the present disclosure.

For example, FIG. 5 illustrates a computing and processing device that can be implemented according to the method of the present disclosure. This computing and processing device traditionally includes a processor 1010 and a computer program product or computer-readable medium in the form of a memory 1020. The memory 1020 can be electronic memory such as flash memory, Electrically Erasable Programmable Read Only Memory (EEPROM), EPROM, hard disk, or ROM. The memory 1020 has a storage space 1030 for program code 1031 used to execute any step of the method mentioned above. For example, the storage space 1030 for program code can include various program codes 1031 for implementing various steps in the above method. These program codes can be read from or written into one or more computer program products. These computer program products include program code carriers such as hard drives, compact discs (CD), memory cards, or floppy disks. Such computer program products are usually portable or fixed storage units as described in FIG. 6. The storage unit may have storage segments, storage space, and the like arranged similarly to the memory 1020 in the computing and processing device of FIG. 5. The program code can be compressed in an appropriate form, for example. Typically, the storage unit includes computer-readable code 1031', which can be read by a processor such as 1010, causing the computing and processing device to execute various steps in the methods described above when run by the computing processing device.

The embodiments of the description are described in the mode of progression, each of the embodiments emphatically describes the differences from the other embodiments, and the same or similar parts of the embodiments may refer to each other.

A person skilled in the art should understand that the embodiments of the present application may be provided as a method, a device, or a computer program product. Therefore, the embodiments of the present application may take the form of a complete hardware embodiment, a complete software embodiment, or an embodiment combining software and hardware. Furthermore, the embodiments of the present application may take the form of a computer program product implemented on one or more computer-usable storage media (including but not limited to a disk storage, a CD-ROM, an optical memory and so on) containing a computer-usable program code therein.

The embodiments of the present application are described with reference to the flow charts and/or block diagrams of the method, the terminal device (system), and the computer program product according to the embodiments of the present application. It should be understood that each flow and/or block in the flow charts and/or block diagrams, and combinations of the flows and/or blocks in the flow charts and/or block diagrams, may be implemented by a computer program instruction. The computer program instructions may be provided to a processor of a general-purpose computer, a special-purpose computer, an embedded processor, or another programmable data processing terminal device to generate a machine, so that a device for implementing the functions specified in one or more flows of the flow charts and/or one or more blocks of the block diagrams can be generated by instructions executed by the processor of the computers or the other programmable data processing terminal device.

The computer program instructions may also be stored in a computer-readable memory that can instruct the computers or the other programmable data processing terminal device to operate in a specific mode, so that the instructions stored in the computer-readable memory generate an article including an instruction device, and the instruction device implements the functions specified in one or more flows of the flow charts and/or one or more blocks of the block diagrams.

The computer program instructions may also be loaded to the computers or the other programmable data processing terminal device, so that the computers or the other programmable data processing terminal device implement a series of operation steps to generate the computer-implemented processes, whereby the instructions executed in the computers or the other programmable data processing terminal device provide the steps for implementing the functions specified in one or more flows of the flow charts and/or one or more blocks of the block diagrams.

Although preferable embodiments of the embodiments of the present application are described, once a person skilled in the art has known the essential inventive concept, he may make further variations and modifications on those embodiments. Therefore, the appended claims are intended to be interpreted as including the preferable embodiments and all of the variations and modifications that fall within the scope of the embodiments of the present application.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or terminal devices. Unless further limitation is set forth, an element defined by the wording "comprising a . . . " does not exclude additional same element in the process, method, article or terminal device comprising the element.

The principle and the embodiments of the present application are described herein with reference to the particular examples, and the description of the above embodiments is merely intended to facilitate to comprehend the method according to the present application and its core concept. Moreover, for a person skilled in the art, according to the concept of the present application, the particular embodiments and the range of application may be varied. In conclusion, the contents of the description should not be understood as limiting the present application.

What is claimed is:

1. A method for semantic analysis on a confrontation scenario based on target-attribute-relation, comprising:
  pre-processing initial data of an acquired to-be-analyzed confrontation scenario, to obtain triplet data marked in a graph data structure, wherein the triplet data comprise: a plurality of target nodes, an attribute of each of the target nodes and predicted relations between the target nodes;

inputting the triplet data into a pre-trained analyzing model, to determine a result of analysis on semantic information of the to-be-analyzed confrontation scenario;

wherein the analyzing model comprises a plurality of operator networks that are provided with execution priorities, wherein the plurality of operator networks are configured for analyzing relations between target nodes and wherein the analyzing model is trained by using the steps of:

acquiring simulated samples, and pre-training individual instances of the operator networks; and acquiring samples marked with a plurality of relations between target nodes, and performing joint training to all of the individual operator networks that are pre-trained, to obtain the analyzing model;

wherein a process of processing of any one of the operator networks comprises: according to a relation between target nodes processed by the any one of the operator networks, selecting, from the plurality of target nodes, all of node pairs that satisfy the relation between target nodes, and determining respective processing data of all of the node pairs; and processing the processing data of all of the node pairs, and according to a processing result that is obtained by the processing, updating markers in the graph data structure; and wherein the processing data of the node pairs corresponding to the operator network having an inferior priority comprise the processing result of the operator network having a prior priority, and the processing result of any one of the operator networks comprises: in the relation-between target nodes corresponding to the operator network, respective relations of all of the node pairs, and confidences and descriptive values of the relations; and according to the graph data structure that is updated by using the processing results of all of the operator networks, characterizing the result of analysis on the semantic information of the to-be-analyzed confrontation scenario.

2. The method according to claim 1, wherein each of the individual operator networks comprises a data collating module and a data processing module, wherein the data processing module comprises a feature extracting network, a feature transforming network, a feature integrating network and a result outputting network;

wherein the step of acquiring the simulated samples, and pre-training the individual instances of the operator networks comprises:

pre-processing the acquired simulated samples that express the same relations between target nodes, to obtain sample triplet data marked in the graph data structure, wherein the sample triplet data comprise: a plurality of target sample nodes, attributes corresponding to the plurality of target sample nodes individually, and relations between the target sample nodes;

determining, by the data collating module, the processing data of any one head-tail node pair in the plurality of target sample nodes, wherein the processing data comprises an attribute of a sample head node, an attribute of a sample tail node, a neighbor relation of the sample head node, a neighbor relation of the sample tail node, a relation of the sample head node-the sample tail node, and a relation of the sample tail node-the sample head node;

extracting, by the feature extracting network, a head-tail node feature, a head-node-neighbor feature set, a tail-node-neighbor feature set, a feature set of a relation from a head node pointing to a tail node, and a feature set of a relation from a tail node pointing to a head node;

by the feature transforming network, according to the head-tail node feature, transforming the head-node-neighbor feature set, the tail-node-neighbor feature set, the feature set of the relation from the head node pointing to the tail node, and the feature set of the relation from the tail node pointing to the head node;

performing, by the feature integrating network, averaging and extending processing to an output of the feature transforming network;

by the result outputting network, according to an output of the feature integrating network, determining an outputted result of the individual operator network and marking in the graph data structure, wherein the outputted result comprises: a confidence, a descriptive value and a dynamic attribute of the relation between target nodes; and based on an outputted result of the result outputting network, updating a parameter of the individual operator network.

3. The method according to claim 2, wherein the step of acquiring the samples marked with a plurality of relations between target nodes, and performing the joint training to all of the individual operator networks that are pre-trained, to obtain the analyzing model comprises:

deciding execution priorities of all of the individual operator networks that are pre-trained;

acquiring and pre-processing true samples marked with a plurality of relations between the target nodes, to obtain true triplet data marked in the graph data structure, wherein the true triplet data comprise a plurality of target true-sample nodes, attributes corresponding to the plurality of target true-sample nodes individually, and relations between the target true-sample nodes;

by the operator network having a prior priority, processing the respective processing data of all of the node pairs corresponding thereto, to obtain an outputted result and marking the outputted result in the graph data structure;

by the operator network having an inferior priority, according to the relation between target nodes processed thereby and based on the outputted results of all of the operator networks having a prior priority, determining and processing the respective processing data of all of the node pairs that satisfy the relation between target nodes, to obtain an outputted result and marking the outputted result in the graph data structure; and based on the outputted result of the individual operator network having a most inferior priority of all operator networks, updating a model parameter.

4. The method according to claim 3, wherein, for any one of the operator networks, obtaining the outputted result and marking the outputted result in the graph data structure comprises:

determining confidences in the outputted results obtained by any one of the operator networks one by one;

maintaining a relation in which the confidence is greater than a preset threshold, and marking the confidence of the relation and the descriptive value of the relation in the graph data structure; and deleting a relation in which the confidence is less than or equal to the preset threshold.

5. The method according to claim 2, wherein when the individual operator networks are trained, joint optimization is used, wherein the result outputting network comprises a confidence outputting network and a descriptive-value outputting network, wherein a loss of the confidence outputting network is $L_{BCE,conf}$, a loss of the descriptive-value outputting network is $L_{MSE,edge}$, and a loss function of the individual operator network is:

$$L_{all} = \lambda_1 L_{BCE,conf} + \lambda_2 L_{MSE,edge}$$

the step of, based on the outputted result of the result outputting network, updating the parameter of the individual operator network comprises:

based on a value of the loss function of the individual operator network, updating the parameter of the individual operator network.

6. The method according to claim 3, wherein, in the joint training, obtaining the outputted result and marking the outputted result in the graph data structure comprises:

after the result outputting network of the operator network having a prior priority outputs the confidence of the head-tail node relation of each of the samples, using the confidence as a probability value with which the relation exists;

in a process of execution of the operator network having an inferior priority, performing n times of sampling, wherein for an operator A having an inferior priority, a true value of $conf_{i,A}$ obtained in the i-th time is α, wherein if the relation truly exists, α=1, or else α=0; and expressing an indicative function of the relation r used in this time of sampling as I(r), wherein if the relation r truly exists, I(r)=1, or else I(r)=0; and a formula for calculating a value $conf_r$ of a semi-supervised confidence of the relation r is:

$$\beta = \frac{1}{n}\sum_{i=1}^{n}\left[||1-\alpha|-conf_{i,A}|*I(r) + |\alpha-conf_{i,A}|*(1-I(r))\right]$$

$$conf_r = \begin{cases} 1, & (\beta > \sigma) \\ 0, & (\beta < \sigma) \end{cases}$$

wherein σ is a determination threshold.

7. The method according to claim 1, wherein the attribute of each of the target nodes comprises a static attribute and a dynamic attribute, and the processing results of some of the operator networks further comprise the dynamic attributes of the target nodes; and the step of, according to the processing result that is obtained by the processing, updating the markers in the graph data structure comprises:

sending the dynamic attributes of the target nodes that are obtained by the processing by the some of the operator networks to the plurality of target nodes in the to-be-analyzed confrontation scenario, and updating the respective dynamic attributes of the plurality of target nodes.

8. A computing and processing device, comprising:
a memory storing computer-readable code; and
one or more processors, wherein when the computer-readable code is executed by the one or more processors, the computing and processing device executes the method for semantic analysis on the confrontation scenario based on target-attribute-relation according to claim 1.

9. A non-transitory computer-readable storage medium, storing computer instructions, wherein when the computer instructions are executed by a processor, the method for semantic analysis on the confrontation scenario based on target-attribute-relation according to claim 1 is implemented.

* * * * *